United States Patent Office 3,168,541
Patented Feb. 2, 1965

3,168,541
FERROUS GLUTAMATE
Millice Floyd Hobbs, Monte Sereno, Calif., assignor to International Minerals & Chemical Corporation, a corporation of New York
No Drawing. Filed Mar. 6, 1962, Ser. No. 177,737
6 Claims. (Cl. 260—439)

The present invention relates to the production of ferrous glutamate and more particularly to the production of ferrous glutamate having a high iron content.

Ferrous glutamate generally has been used in the field of medicine for the treatment of a blood-iron deficiency. It has an advantage over other iron compounds, such as ferrous gluconate or ferrous citrate, because, unlike these compounds, the glutamate does not have a bitter, disagreeable taste. Consequently, ferrous glutamate is ideally suited for use in tablet form to be taken orally. It, of course, can also be injected intravenously.

Ferrous glutamate-containing products have been prepared in the past, inter alia, by refluxing glutamic acid with iron filings (Beilstein, vols. III and IV, page 538). The product (ferrous diglutamate) was recovered in a solid form from the reaction mixture by evaporating the mixture to dryness. The product so produced generally contained between about 40 and about 60% of ferrous glutamate, the remainder of the product being a ferrous salt of pyrollidone carboxylic acid which, of course, is a lactam of glutamic acid. In an effort to improve the quality of the product, U.S. 2,766,268 described a complete process which reacted a barium or calcium glutamate with a soluble ferrous salt whose anion formed a water insoluble salt with the alkaline earth metal, and, after filtering to remove insolubles, the reaction medium was evaporated to dryness. The product was a substantially pure ferrous glutamate and, as described in the patent, contained approximately 15% iron. The product was considered to be a monohydrate.

While the method of U.S. 2,766,268 improved product quality and yield, the product still tended to be somewhat unstable. The product, for example, tended to turn from a light tan to a darker brown upon standing for extended periods of time. This instability also characterized the glutamate made from iron filings.

It is a primary object of the present invention to provide a stable dry ferrous glutamate.

It is a further object of the present invention to provide a stable crystalline ferrous glutamate having a high iron content.

It is a still further object of the invention to provide a substantially pure ferrous glutamate suitable for pharmaceutical purposes.

The present invention provides novel, stable, dry ferrous glutamate crystals containing ferrous iron and glutamate values in a mole ratio of 1:1. The ferrous glutamate crystals of this invention are prepared by crystallizing ferrous monoglutamate from an aqueous solution and are most appropriately prepared by reacting in an aqueous medium a soluble ferrous salt with a material selected from the group consisting of glutamic acid, and glutamic acid salts to provide an aqueous medium containing ferrous monoglutamate, and crystallizing ferrous monoglutamate therefrom.

The dry ferrous glutamate crystals of this invention are characterized by a ferrous iron content of from about 22 to about 23.5% and are stable in storage. Even after extended storage, the product does not exhibit a tendency to turn dark. The product contains a ferrous iron:glutamate mole ratio of 1:1 and analyzes as a dihydrate.

The ferrous salts which may be employed in the practice of the present invention are water soluble at reaction conditions and include, without limitation, ferrous carbonate, ferrous sulfate, ferrous chloride, ferrous phosphate, ferrous acetate, ferrous formate and the like.

The ferrous salts are reacted in the aqueous medium preferably with at least a stoichiometric amount of glutamic acid, or a glutamic acid salt such as an alkali metal glutamate (including monoammonium glutamate), or an alkaline earth metal glutamate to form ferrous monoglutamate. The selection of the most appropriate glutamate starting material will depend in part upon the ferrous salts chosen for the practice of the invention. When the soluble ferrous salt is a salt of an acid weaker than glutamic acid, the ferrous salt will react readily with glutamic acid or with a glutamate salt. When the soluble ferrous salt is a salt of an acid stronger than glutamic acid, the reaction occurs most readily with glutamate salts. The equilibrium of the reaction can be driven to ferrous monoglutamate by the liberation of gas, precipitation of an insoluble inorganic salt, or by the crystallization of ferrous monoglutamate from the system.

If ferrous carbonate is employed for the practice of the invention, the glutamate values most desirably are employed as glutamic acid. The ferrous carbonate tends to be soluble at lower pH's. The ensuing reaction will be:

$$FeCO_3 + GA \rightarrow FeGA + CO_2 \uparrow$$
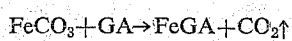

Since this reaction proceeds readily and does not require the addition of any other materials to the medium, the use of ferrous carbonate in conjunction with glutamic acid constitutes a preferred embodiment of this invention.

When ferrous salts such as a ferrous sulfate, ferrous chloride, and the like are employed, the reaction mixture should also contain a base in a quantity at least equal to the stoichiometric amount of the ferrous salt employed. Bases suitable for this purpose include, inter alia, sodium hydroxide, potassium hydroxide, barium hydroxide, calcium hydroxide and the like. In determining the minimum stoichiometric amount of base required, any metal added to the medium as a glutamate salt can be considered to be a base. Thus, for example, if ferrous sulfate is reacted with glutamic acid in the presence of sodium hydroxide, the medium should contain at least 2 moles of sodium hydroxide for each mole of ferrous sulfate employed. If, however, the ferrous sulfate is incorporated in an aqueous medium containing an equivalent molar amount of monosodium glutamate, only one additional mole of sodium hydroxide is required. It will be apparent that if a glutamate salt is employed in sufficient excess, no additional base will be required. It will also be apparent that a mixture of bases (e.g. sodium hydroxide and potassium hydroxide) may be employed in the reaction system. In all events, the pH of the reaction medium should be maintained below about pH 7.0.

Exemplifying the reaction with ferrous sulfate, the reaction will be characterized as follows:

$$FeSO_4 + NaGA + NaOH \rightarrow FeGA \downarrow + Na_2SO_4$$
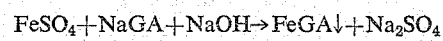

Upon crystallization of the ferrous glutamate, equilibrium of the reaction will be driven to the right and the formation of additional ferrous monoglutamate.

The relative quantities of ferrous salts and glutamate values in the reaction medium are not critical to the reaction. For most efficient results, however, it is preferred to maintain a ratio of ferrous ions to glutamate ions of at least 1:1. Large excesses of glutamate ions tend to make selective crystallization of ferrous glutamate more difficult and, accordingly, it is preferred to maintain a mole ratio of Fe:glutamate in the reaction medium of from about 1:1 to about 1:2.5. Particularly preferred mediums will be characterized by a mole ratio of Fe:glutamate of about 1:1 to about 1:2.

The reaction of the ferrous salt with glutamic acid proceeds efficiently at room temperatures and an equilibrium will be reached in less than one hour in most cases. While the reaction proceeds readily at room temperature, the invention also broadly contemplates reaction temperatures from about 20 to about 100° C. Even higher temperatures can be employed if due care is taken to avoid the formation of pyrrolidone carboxylic acid.

Since ferrous ions oxidize readily to ferric ions, it is important that the process of the present invention be conducted under an inert atmosphere, such as, for example, nitrogen or carbon dioxide. In order to insure that the ferrous ions in solution are not oxidized, a small amount of reduced iron filings may be included in the reaction medium. While reduced iron filings are a most appropriate means of preventing the oxidation of ferrous ions in solution, other materials such as sodium sulfite may also be employed. These materials are used merely as a precautionary measure and are not essential to the operability of this invention.

After the reaction has proceeded to substantial equilibrium, the medium, if required, is filtered to remove insolubles. Thereafter the ferrous monoglutamate is selectively crystallized from the solution. Crystallization most appropriately may be accomplished by increasing the concentration of ferrous monoglutamate in the aqueous medium. The medium for example, can be concentrated by partial evaporation, or the reaction can be conducted at an elevated temperature such as 65° C. and thereafter slowly cooled to crystallize ferrous monoglutamate. While not essential, the rate of crystallization can be increased by seeding the solution with crystals of ferrous monoglutamate. In the event that the reaction medium contains excess glutamic acid, the formation of glutamic acid crystals can be avoided by adjusting the pH of the solution to about 6 with an alkali metal hydroxide. Such adjustment converts the glutamic acid to a soluble glutamate salt.

The crystals of ferrous monoglutamate may be recovered from the aqueous medium in any suitable manner such as, for example, by centrifuging. Following removal from the solution, the crystals may be washed to remove excess reaction medium therefrom and then dried to provide a substantially pure crystalline ferrous monoglutamate.

A typical ferrous glutamate produced in accordance with the present invention analyzes as follows:

| | Ferrous Monoglutamate · $2H_2O$ | |
|---|---|---|
| | Theory | Product [1] |
| Percent Fe (Total) | 23.57 | 23.3 |
| (Ferrous) | 23.57 | 23.0 |
| Percent Nitrogen | 5.91 | 5.85 |
| As Glutamic Acid | 62.08 | 61.46 |
| Percent Vac Dry Substance (100° C., 55 mm. Hg) | 84.79 | 84.8 |
| As $H_2O$ of Crystallization | 15.21 | 15.2 |

[1] Values corrected to 100% dry substance.

As indicated earlier, the ferrous monoglutamate crystals of this invention are ideally suited for the treatment of iron deficiency anemia. Employing methods well known to the art, the crystals can readily be formed into dry tablets to be taken orally. These crystals tend to be water insoluble but are readily soluble under the acid conditions existing in the digestive system.

The ferrous monoglutamate crystals may be readily solubilized in an aqueous pharmaceutical carrier by adjusting the pH of the carrier to between about 4.7 and about 5.5. Such adjustment may be accomplished with glutamic acid or may be accomplished with other non-toxic acid materials. For example, ascorbic acid, citric acid or the like may be employed to provide an aqueous pharmaceutical carrier having medicinal value in addition to its content of ferrous monoglutamate. The ferrous monoglutamate is also soluble in organic pharmaceutical carriers. Such carriers are well known to the art.

The following examples are included to demonstrate more fully the practice of the present invention. These examples are included for illustrative purposes only and are in no way intended to limit the scope of the invention.

*Example I*

$FeSO_4 \cdot 7H_2O$ (280 pounds) (1 mole) and iron powder (2 pounds) were slurried in 400 pounds of water which was held at 30° C. To this mixture, $NaHCO_3$ (166 pounds) was added slowly, followed by an addition of NaOH (4 pounds of 50% solution). The system was held under a carbon dioxide atmosphere for one hour at 30° C. to allow for the crystallization of ferrous carbonate. The ferrous carbonate was recovered by filtration and was washed with 200 pounds of water saturated with carbon dioxide.

The washed wet cake of ferrous carbonate (203 pounds) was added slowly to a slurry of L-glutamic acid (313 pounds) (2.13 moles) and iron powder (3 pounds) mixed in 1900 pounds of water. The mixture, which had a pH of 4.5, was heated to 65° C. and held for 12 hours and then filtered to remove insolubles. NaOH (90 pounds of 22% solution) was added to adjust the hot (50° C.) filtrate which was held under a carbon dioxide atmosphere, to 6.0 pH, and the mixture was cooled to room temperature and held for 12 hours to allow for the crystallization of the ferrous mono-L-glutamate. The crystals were recovered by centrifugation and were washed successively with water (100 pounds) saturated with L-glutamic acid, 50% methanol water solution (100 pounds of 50% by volume) and by absolute methanol (50 pounds). The centrifuge cake was removed and slurried in absolute methanol (125 pounds) and then centrifuged. The methanol cake was dried in an atmospheric dryer at 70° C. for 3 hours. The dry ferrous mono-L-glutamate that was recovered weighed 134 pounds.

The mother liquor from this procedure had a pH of 6.0 and contained L-glutamate values of which 118 pounds were recovered as L-glutamic acid by adjustment to 3.2 pH using hydrochloric acid.

The analysis of the dried ferrous mono-L-glutamate cake obtained was as follows:

| | Percent |
|---|---|
| Dry substance (3 hrs. at 85° C. and atmospheric pressure) | 99.5 |
| Total iron | 23.2 |
| Ferrous iron | 22.1 |
| Glutamic acid (by KjN) | 60.9 |

*Example II*

$FeSO_4 \cdot 7H_2O$ (145 grams) (.52 mole), monosodium-L-glutamate (127 grams) (.68 mole), and reduced iron powder (1 gram) were slurried in 500 grams of water and heated to 65° C. and held for ½ hour. One gram of $Na_2S_2O_4$ was added to help reduce ferric iron. Insoluble material was removed by filtration and the filtrate (pH of 5.3 at 30° C.) was adjusted to 6.0 pH with NaOH (32 grams of a 50% solution), which was added slowly. The adjusted material was held overnight to cool and crystallize ferrous mono-L-glutamate. The crystals were filtered using a Büchner filter and were washed successively with water (100 ml.) saturated with glutamic acid and with methanol (150 ml.). The crystals were dried overnight at room temperature in a vacuum desiccator under reduced pressure over sulfuric acid and then for 45 minutes in an 85° C. oven at atmospheric pressure. The weight of the recovered ferrous mono-L-glutamate cake was 85 grams.

The analysis of the cake obtained was as follows:

| | Percent |
|---|---|
| Dry substance (3 hrs. at 85° C. and atmospheric pressure) | 98.7 |
| Total iron | 23.4 |
| Ferrous iron | 22.4 |
| Glutamic acid (by KjN) | 60.7 |

*Example III*

$FeSO_4 \cdot 7H_2O$ (435 grams) (1.57 moles), L-glutamic acid (300 grams) (2.04 moles), and reduced iron powder (2 grams) were slurried in 1350 grams of water. One gram of $Na_2S_2O_4$ was added to help reduce the ferric iron. The slurry was adjusted to a pH of 4.7 (@ 40° C.) using NaOH (150 grams of a 50% solution) and then heated to 65° C. and held for ½ hour. Insoluble material was removed by filtration and the filtrate while warm (40° C.) was adjusted to 6.0 pH using NaOH (273 grams of a 20% solution). The adjusted material was held overnight to allow for the crystallization of ferrous mono-L-glutamate. The crystals were filtered and washed successively with water (250 ml.) saturated with L-glutamic acid and with methanol (400 ml.). The crystals were dried very carefully at 85° C. for 3 hours at atmospheric pressure. The recovery of ferrous mono-L-glutamate was 257 grams.

The analysis of the cake obtained was as follows:

| | Percent |
|---|---|
| Dry substance (3 hrs. at 85° C. and atmospheric pressure) | 99.6 |
| Total iron | 23.2 |
| Ferrous iron | 22.9 |
| Glutamic acid (by KjN) | 61.2 |
| Vacuum dry substance (100° C. and 55 mm. Hg) | 84.5 |

*Example IV*

Glutamic acid (277 grams) (1.88 moles), $Ba(OH)_2 \cdot 8H_2O$ (540 grams), and reduced iron powder (2 grams) were slurried in 4000 grams of water and heated to 70° C. under an inert atmosphere. $FeSO_4 \cdot 7H_2O$ (407 grams) (1.46 moles), and coarse filter aid (80 grams) were added and the mixture held for ½ hour before filtering to remove $BaSO_4$. The filtrate had a dry substance of 3.5% and a pH of 6.45. This material was evaporated under reduced pressure at 55° C. to produce a ferrous mono-L-glutamate crystallizer. The crystallizer was allowed to cool and crystallize and was held overnight. The crystals were removed on a Büchner filter and successively washed with water and methanol. The cake recovered weighed 20 grams and analyzed 22.7% ferrous iron. The mother liquor obtained had a dry substance of 13.5% and a pH of 5.20 at 30° C.

While the invention has been described involving the crystallization of ferrous glutamate it will be apparent that glutamic acid (concurrently) may be crystallized from the medium to provide a mixture of ferrous monoglutamate crystals with glutamic acid crystals.

Since modifications of the present invention will be apparent to those skilled in the art, it is intended that this invention be limited only by the scope of the appended claims.

I claim:

1. The method of the production of ferrous monoglutamate which comprises reacting in aqueous solution a ferrous salt with a glutamic acid material selected from the group consisting of glutamic acid and glutamic acid salts at a pH below 7.0 to form ferrous monoglutamate, increasing the concentration of ferrous monoglutamate in said aqueous solution at an elevated temperature, cooling said aqueous solution to a temperature below the crystallization temperature of said ferrous monoglutamate in said aqueous solution to precipitate crystals of ferrous monoglutamate from said solution and recovering ferrous monoglutamate crystals therefrom.

2. The method of claim 1 wherein the ferrous salt and glutamic acid material are present in a mole ratio of from about 1:1 to about 1:2.5.

3. The method of claim 1 wherein the ferrous salt is ferrous carbonate and the glutamic acid material is glutamic acid.

4. The method of claim 1 wherein the ferrous salt is ferrous sulfate.

5. The method of claim 1 wherein the ferrous salt is ferrous chloride.

6. Crystalline ferrous monoglutamate dihydrate.

References Cited in the file of this patent

UNITED STATES PATENTS

| 2,688,032 | Kopelman | Aug. 31, 1954 |
| 2,766,268 | Skelly | Oct. 9, 1956 |
| 2,810,754 | Chang et al. | Oct. 22, 1957 |
| 2,957,806 | Rummel | Oct. 25, 1960 |
| 2,985,559 | Coles | May 23, 1961 |
| 2,985,676 | Dumesnil | May 23, 1961 |